US011556332B2

(12) United States Patent
Guan et al.

(10) Patent No.: US 11,556,332 B2
(45) Date of Patent: Jan. 17, 2023

(54) APPLICATION UPDATING IN A COMPUTING ENVIRONMENT USING A FUNCTION DEPLOYMENT COMPONENT

(71) Applicant: International Business Machines Corporation, Armonk, NY (US)

(72) Inventors: Zhi Li Guan, Beijing (CN); Yan Fen Guo, Beijing (CN); Jie Ke Fang, Beijing (CN); Guo Liang Huang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 17/182,338

(22) Filed: Feb. 23, 2021

(65) Prior Publication Data

US 2022/0269495 A1 Aug. 25, 2022

(51) Int. Cl.
*G06F 8/65* (2018.01)
*H04L 67/00* (2022.01)
*H04L 67/10* (2022.01)

(52) U.S. Cl.
CPC .............. *G06F 8/65* (2013.01); *H04L 67/10* (2013.01); *H04L 67/34* (2013.01)

(58) Field of Classification Search
CPC ............ G06F 8/65; H04L 67/10; H04L 67/34
See application file for complete search history.

(56) References Cited

U.S. PATENT DOCUMENTS 8,850,419 B1\* 9/2014 Fitzgerald ........... G07F 17/0021
717/168
11,343,140 B2\* 5/2022 Singh .................. H04L 41/0813
(Continued)

FOREIGN PATENT DOCUMENTS

CN 109885389 A 6/2019
CN 110737454 A \* 1/2020
(Continued)

OTHER PUBLICATIONS

"Fine Parallel Processing Using a Work Queue", Kubernetes Documentation, Aug. 7, 2020, 5 pages, <https://kubernetes.io/docs/tasks/job/fine-parallel-processing-work-queue/>.
(Continued)

*Primary Examiner* — Daxin Wu
(74) *Attorney, Agent, or Firm* — Edward J. Wixted, III

(57) ABSTRACT

In an approach, a processor, in response to detecting a new customer resource (CR) file: requests, the computing environment to deploy a plurality of function deployment components in the computing environment, where: the CR file indicates information of a plurality of functions of an application; the plurality of function deployment components request the computing environment to deploy a plurality of function components in the computing environment; and the plurality of function components execute the plurality of functions of the application; determines that each of the plurality of function components has been deployed in the computing environment; and in response to determining that each of the plurality of function components has been deployed in the computing environment, requests the computing environment to delete each of the plurality of deployed function deployment components.

17 Claims, 9 Drawing Sheets

(56) References Cited

U.S. PATENT DOCUMENTS

| | | | |
|---|---|---|---|
| 2012/0266168 A1* | 10/2012 | Spivak | G06F 8/71 |
| | | | 718/1 |
| 2015/0256481 A1* | 9/2015 | Turovsky | H04L 47/76 |
| | | | 709/226 |
| 2016/0132214 A1* | 5/2016 | Koushik | G06F 8/61 |
| | | | 715/741 |
| 2016/0366233 A1* | 12/2016 | Le | G06F 9/5077 |
| 2017/0134519 A1* | 5/2017 | Chen | H04L 67/60 |
| 2018/0276215 A1 | 9/2018 | Chiba et al. | |
| 2018/0287898 A1* | 10/2018 | Bellini, III | H04L 41/5009 |
| 2019/0213004 A1* | 7/2019 | Zhu | H04L 67/34 |
| 2019/0303212 A1 | 10/2019 | Bosch et al. | |
| 2020/0076902 A1* | 3/2020 | Huang | H04L 67/141 |
| 2020/0382438 A1* | 12/2020 | Bregman | H04L 47/70 |
| 2021/0397429 A1* | 12/2021 | Gonzalez | G06F 8/65 |

FOREIGN PATENT DOCUMENTS

| | | |
|---|---|---|
| CN | 110764786 A | 2/2020 |
| CN | 112084008 A | 12/2020 |
| WO | 2018001004 A1 | 1/2018 |

OTHER PUBLICATIONS

"Running tasks in pods using jobs", Red Hat, OpenShift Container Platform 4.6, Printed Jan. 22, 2021, 10 pages, <https://docs.openshift.com/container-platform/4.1/nodes/jobs/nodes-nodes-jobs.html>.

Ellingwood et al., "How to Use Ansible Roles to Abstract your Infrastructure Environment", DigitalOcean Blogspot, Jan. 3, 2020, 23 pages, <https://www.digitalocean.com/community/tutorials/how-to-use-ansible-roles-to-abstract-your-infrastructure-environment>.

Gunduz, Ibrahim, "Parallel Playbook Execution in Ansible", Developer Space, May 6, 2017, 4 pages, <https://medium.com/developer-space/parallel-playbook-execution-in-ansible-30799ccda4e0#:~:text=Ansible%2C%20free%20deployment%20strategy%20helps%20us%20to%20run,multiple%20tasks%2C%20you%20can%20split%20the%20installation%20>.

Mell et al., "The NIST Definition of Cloud Computing", Recommendations of the National Institute of Standards and Technology, Special Publication 800-145, Sep. 2011, 7 pages.

Wenzin, Max, "How to run Ansible tasks in parallel", Crisp BlogSpot, Jan. 27, 2018, 5 pages, <https://blog.cnsp.se/2018/01/27/maxwenzin/how-to-run-ansible-tasks-in-parallel>.

* cited by examiner

APPLICATION UPDATING IN A COMPUTING ENVIRONMENT USING A FUNCTION DEPLOYMENT COMPONENT

BACKGROUND

The present invention relates generally to the field of cloud computing technologies, and more particularly to application deployment in a cloud computing environment.

Cloud computing environments, such as Kubernetes or other cloud computing environments, are widely used today. A growing number of applications may need to be deployed in cloud computing environments. In addition, information technology (IT) architectures used by these applications may also be moved to modern cloud computing environments.

A disadvantage of current solutions is that single operators and single customer resources are used. Multiple threads are not supported and roles are processed sequentially resulting in time consuming deployment.

SUMMARY

According to some embodiments of the present invention, a computer-implemented method, computer program product, and computer system are provided. A processor, in response to detecting a new customer resource (CR) file: requests, the computing environment to deploy a plurality of function deployment components in the computing environment, where: the CR file indicates information of a plurality of functions of an application; the plurality of function deployment components request the computing environment to deploy a plurality of function components in the computing environment; and the plurality of function components execute the plurality of functions of the application; determines that each of the plurality of function components has been deployed in the computing environment; and in response to determining that each of the plurality of function components has been deployed in the computing environment, requests the computing environment to delete each of the plurality of deployed function deployment components. Such an approach has the benefit of parallel execution and decreased time for deployment.

Embodiments of the present invention optionally include an approach where the computing environment is a cloud computing environment. Such an approach has the benefit of enabling the parallel execution and decreased deployment time in a cloud computing environment.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure. The various features of the drawings are not to scale as the illustrations are for clarity in facilitating one skilled in the art in understanding the disclosure in conjunction with the detailed description. The drawings are discussed forthwith below.

DETAILED DESCRIPTION

Figure 1:
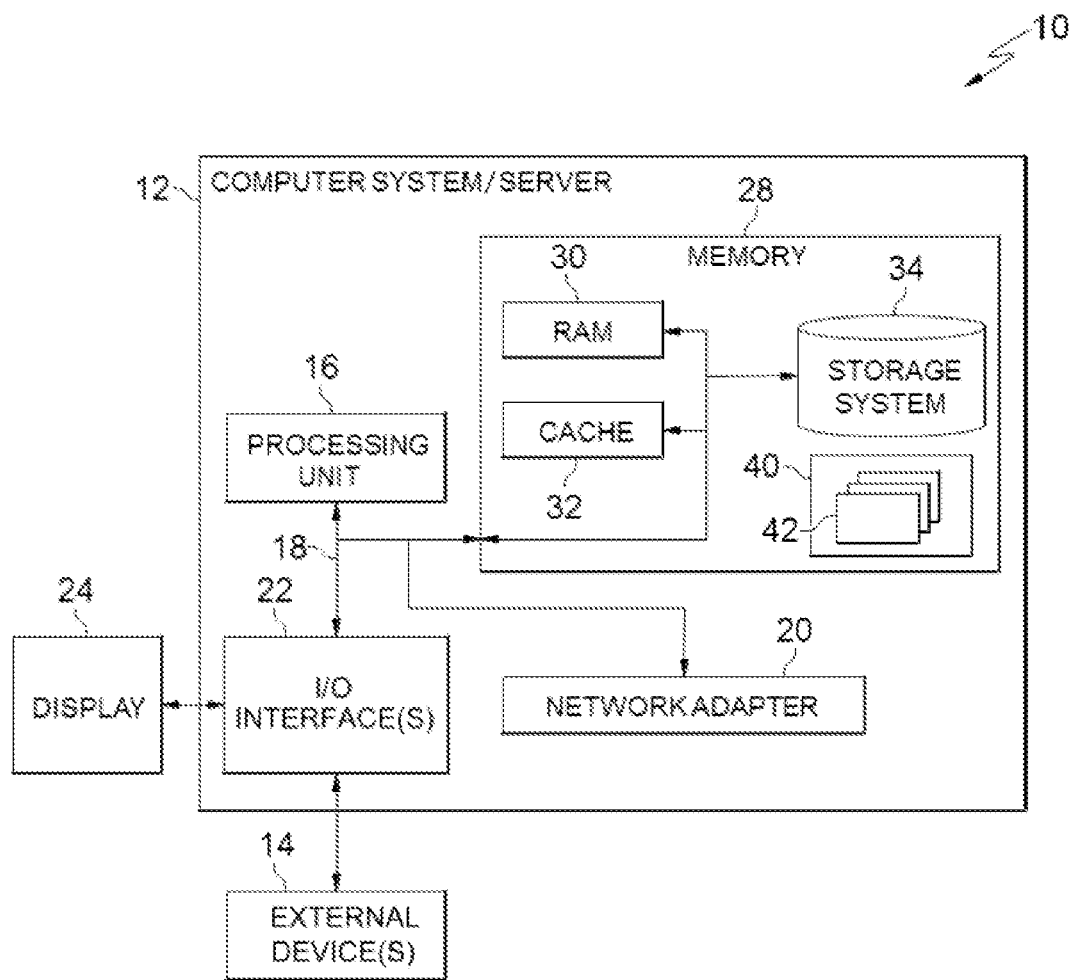
FIG. 1 depicts a cloud computing node according to some embodiments of the present disclosure.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
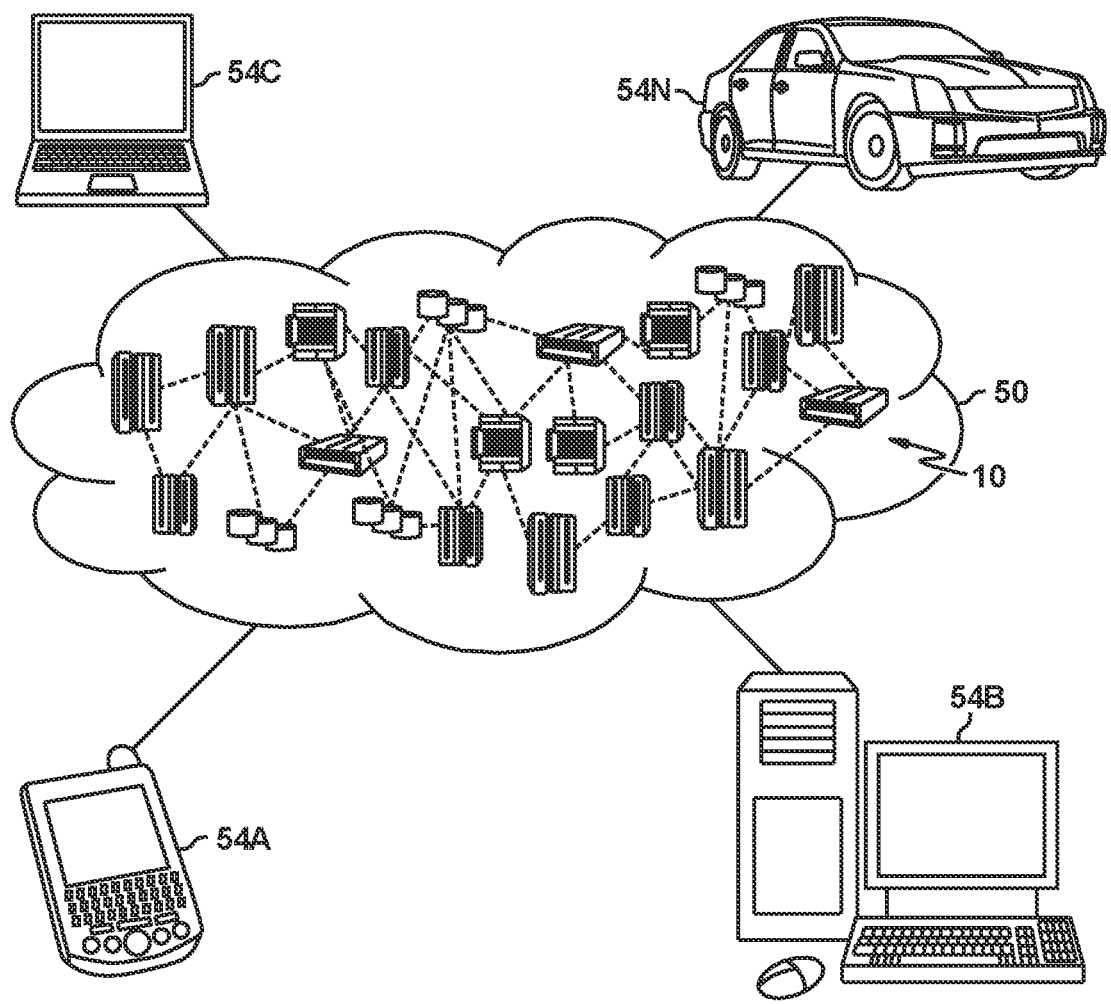
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
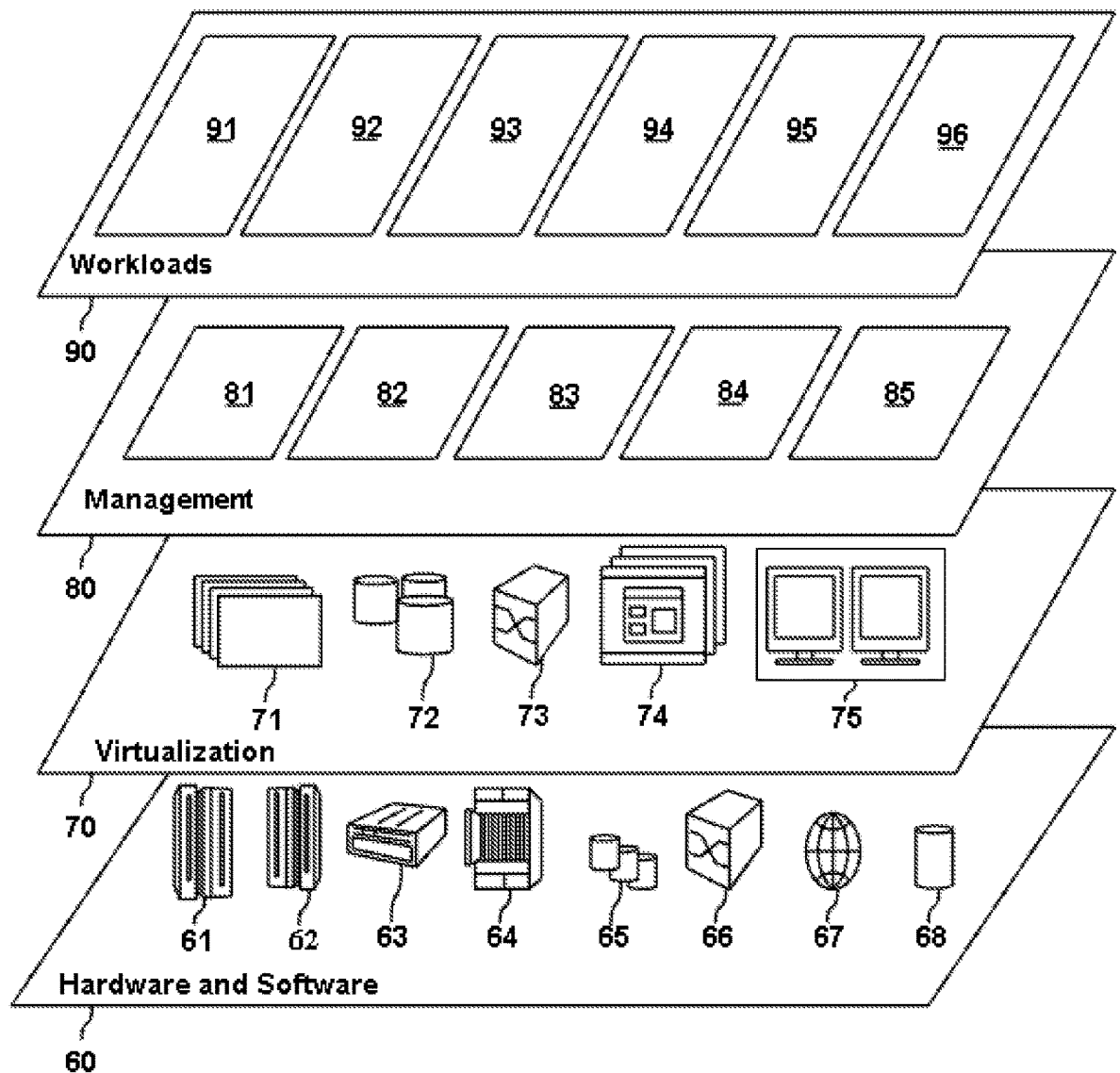
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application deployment 96.

An application may comprise a plurality of functions (also referred to as components, sub-systems). Now more and more service providers would like to deploy their applications in a cloud computing environment so that the applications deployed on the cloud computing environment can be accessed by users. Usually, a function of an application may be deployed in a container of the cloud computing environment, and the deployed function is also referred to as a service or a micro service because it can be accessed as a base service. A set of containers (including such as log collector, Git file fetcher, and the like) sharing the same namespace/network/UTS (UNIX Time Sharing)/PID(Process Identifier), may be comprised in a POD, the smallest schedulable atomic unit used by some cloud computing environments, such as Kubernetes. However, some cloud computing environments may use container as the smallest schedulable atomic unit.

Figure 4:
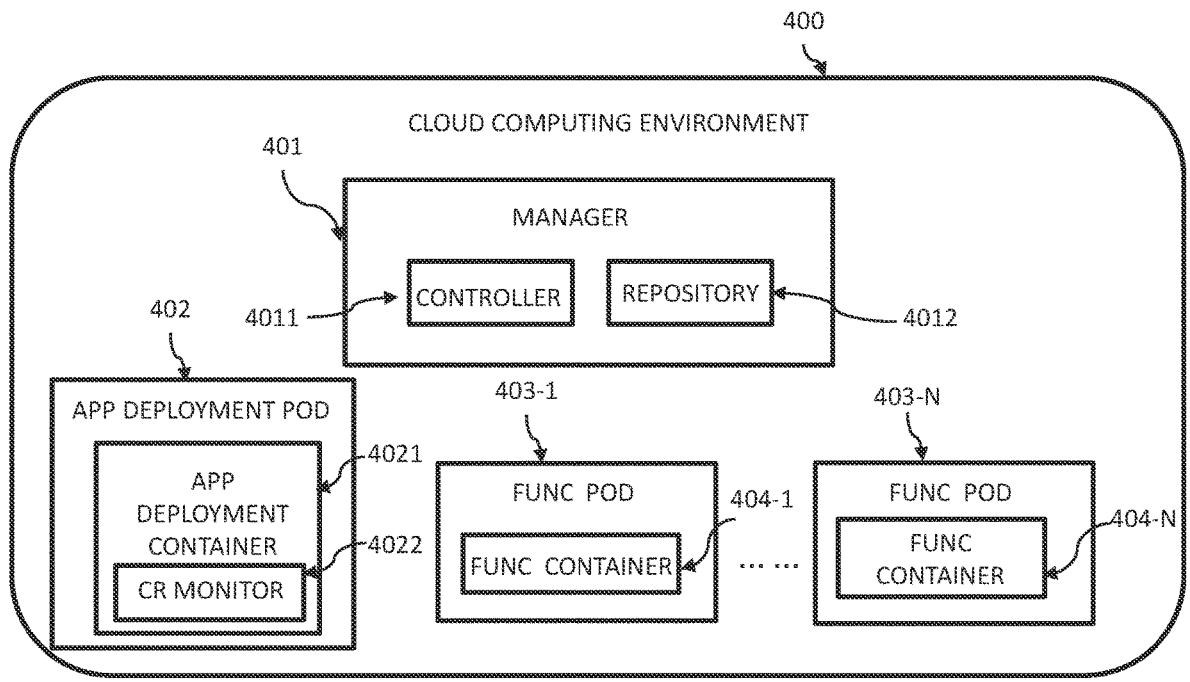
FIG. 4 depicts a schematic diagram of a cloud computing environment for deploying applications according to some embodiments of the present disclosure.

FIG. 4 depicts a schematic diagram of an existing example cloud computing environment 400 for deploying applications. Here a container means a container instance in the cloud computing environment 400, and a container instance is an instance of an image. It should be pointed out that though there are many components in a cloud computing environment, only the components related to the disclosure are considered in this description, and other components unrelated to this disclosure are ignored. Suppose that the application deployed in the cloud computing environment 400 may comprise N functions, where N is an integer larger than one. Referring to FIG. 4, the cloud computing environment 400 may comprise a manager 401, which is a management platform for the cloud computing environment 400 and may at least comprise a controller 4011 and a repository 4012. In order to deploy the application, an administrator of the cloud computing environment 400 may deploy an application deployment POD 402 comprising an application deployment container 4021 using any methods supported by the cloud computing environment 400, such as Operator (a method of packaging, deploying and managing a Kubernetes-native application) in Kubernetes. In other words, the application deployment container is deployed at the same time when the application deployment POD 402 is deployed, and the application deployment container 4021 is comprised in the application deployment POD 402. Hereafter, when we mention a POD comprising a container is deployed, it means that the container is deployed at the same time when the POD is deployed, and the container is comprised in the POD.

A customer resource (CR) file may be stored in the repository 4012 and may be used to indicate information of a plurality of functions of the application, such as location of an image file for each container corresponding to each function of the application, and the like. A CR file is written by the administrator based on a request of the service provider of the application to be deployed in cloud computing environment 400.

The application deployment container 4021 may comprise a component named CR monitor 4022, which may monitor CR files in the repository 4012 regularly. When the CR monitor 4022 detects a CR file, the CR monitor 4022 does not consider whether it is a new CR file, an updated CR file or an existing CR file, the CR monitor 4022 may directly inform the application deployment container 4021 about the CR file. Then application deployment container 4021 may access the CR file and may begin the deployment process. Still, the application deployment container 4021 does not consider whether the CR file is a new CR file, an updated CR file or an existing CR file. During the deployment process, the application deployment container 4021 may request the cloud computing environment 400 to deploy, in a sequential order, a function POD 403-1 comprising the function container 404-1, . . . , a function POD 403-N comprising the function container 404-N, corresponding to N functions of the application. For ease of discussion, the function PODs 403-1 . . . 403-N are collectively or individually referred to as function POD 403 and the function containers 404-1 . . . 404-N are collectively or individually referred to as function container 404. Although the application deployment container 4021 requests to deploy function PODs 403 comprising function containers 404 respectively, the cloud computing environment 400 won't deploy function PODs 403 comprising corresponding function containers 404 directly. Instead, the cloud computing environment 400 may check whether function PODs 403 comprising corresponding function containers 404 exist in the cloud computing environment. If not, the cloud computing environment 400 may deploy them. If yes, the cloud computing environment 400 may determine whether there is any change, that is, function PODs 403 comprising corresponding function containers 404 to be deployed are different from those existing function PODs 403 comprising corresponding function containers 404 in the cloud computing environment 400. If there is a change, the cloud computing environment 400 may deploy the function PODs 403 comprising corresponding function containers 404 again to replace those existing ones or may apply the change for those existing ones so that the function PODs 403 comprising corresponding function containers 404 in the cloud computing environment 400 are updated. However, if there is no change, it means that existing function PODs 403 comprising corresponding function containers 404 can satisfy the requirement, the cloud computing environment 400 won't deploy them repeatedly.

Figure 5:
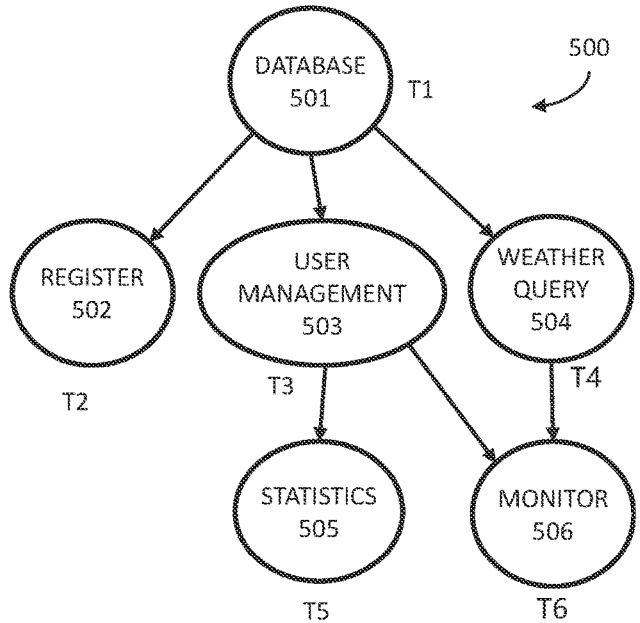
FIG. 5 depicts an example application to be deployed in a cloud computing environment and corresponding dependency relationships among functions included in the application according to some embodiments of the present disclosure.

FIG. 5 depicts an example of an application named Weather Report Application 500 to be deployed in the cloud computing environment 400 and corresponding dependency relationships among functions included in the application. Referring to FIG. 5, the Weather Report Application 500 may include the following functions: database 501, register 502, user management 503, weather query 504, statistics 505 and monitor 506. The dependency relationships are as below: three functions, i.e., the register 502, the user management 503, and the weather query 504, depend on the database 501; two functions, i.e., the statistics 505 and the monitor 506, depend on the user management 503; the monitor 506 also depends on the weather query 504.

Figure 6:
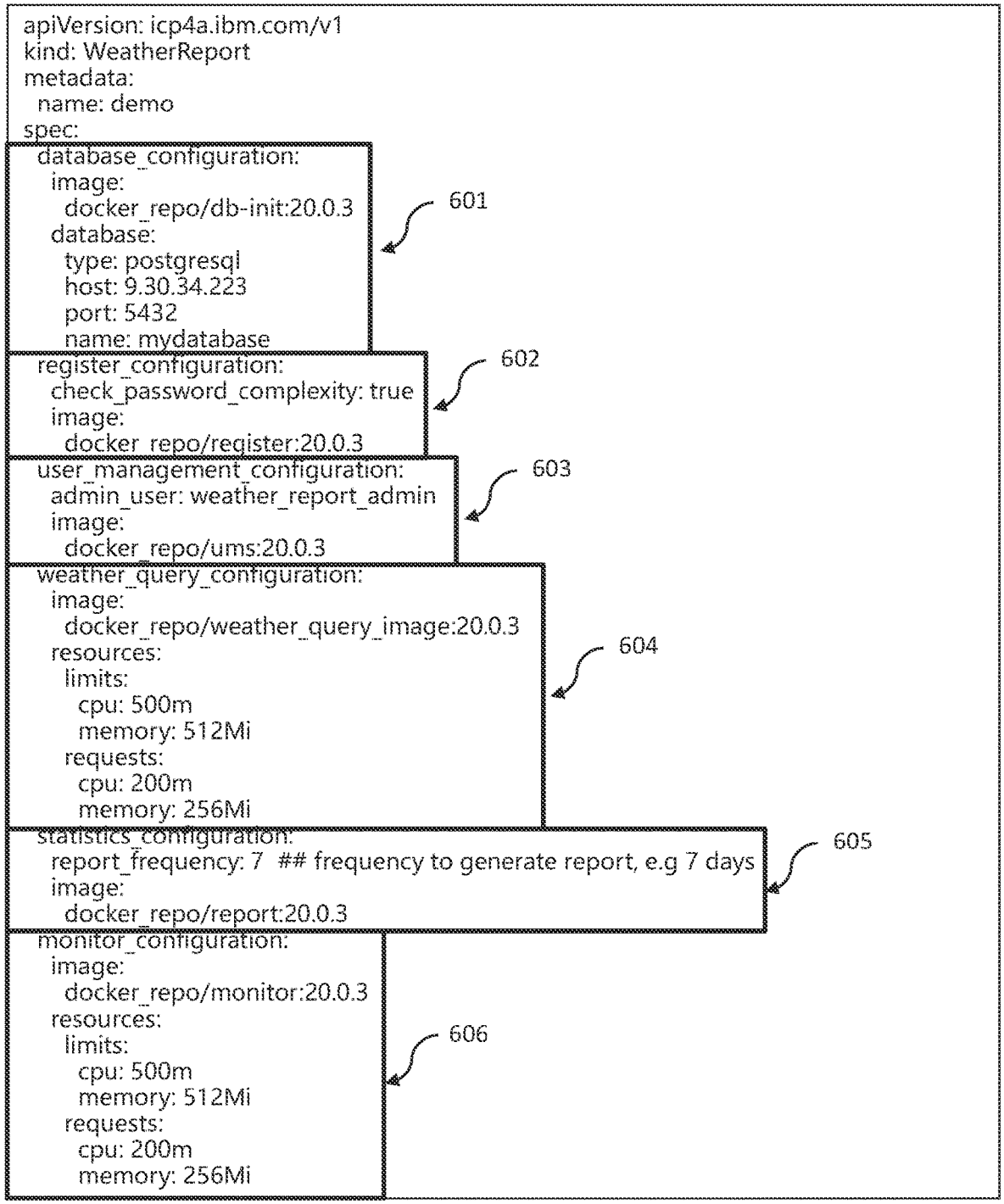
FIG. 6 depicts an example customer resource (CR) file for an example application according to some embodiments of the present disclosure.

FIG. 6 depicts an example CR file for the Weather Report Application 500 shown in FIG. 5. In FIG. 6, block 601 is used to indicate the information of the database 501, block 602 is used to indicate the information of the register 502, block 603 is used to indicate the information of the user management 503, block 604 is used to indicate the information of the weather query 504, block 605 is used to indicate the information of the statistics 505 and block 606 is used to indicate the information of the monitor 506. The CR file includes locations of image files for all function containers to be deployed. After the administrator writes the CR file shown in FIG. 6, the administrator may save the CR file in the repository 4012 of the manager 401 in the cloud computing environment 400.

In the existing cloud computing environment 400, the application deployment container 4021 does not consider the dependency relationships among the functions of the application when deploying these functions, e.g., deploying respective function PODs comprising corresponding containers in a sequential order. For example, for the application 500 shown in FIG. 5, if the application deployment container 4021 detects the CR file shown in FIG. 6, the application deployment container 4021 may access the CR file and request the cloud computing environment 400 to deploy six PODs comprising corresponding containers in sequence, i.e. in the order of respective function PODs of the database 501, the register 502, the user management 503, the weather query 504, the statistics 505 and the monitor 506. Suppose that respective time consumed for deploying respective function PODs comprising corresponding function containers of the database 501, the register 502, the user management 503, the weather query 504, the statistics 505 and the monitor 506 are T1, T2, T3, T4, T5 and T6, the total time for deploying these functions is T=T1+T2+T3+T4+T5+T6 as the deployment of the respective function PODs is in a sequential order. It can be found that if there are a lot of functions in the application, the application deployment is time consuming.

In addition, in the existing cloud computing environment 400, the CR monitor 4022 and the application deployment container 4021 do not consider whether a CR file in the repository is a new CR file, an existing CR file, or an updated CR file, and the application deployment container 4021 requests the cloud computing environment 400 to deploy respective function PODs comprising corresponding function containers directly responsive to detecting the CR file. Moreover, if only one function in the application is changed in the CR file comprising information of 6 functions, the application deployment container 4021 may still request the cloud computing environment 400 to re-deploy all 6 function PODs comprising corresponding function containers instead of deploying only the one function POD comprising corresponding function container corresponding to the changed function. Although for the existing CR file, the cloud computing environment 400 won't deploy function POD(s) comprising corresponding function container(s) for existing function(s) repeatedly, the checking of whether the function POD(s) comprising corresponding function container(s) has been deployed in the cloud computing environment 400 is still time and resource consuming.

For example, for the application 500 shown in FIG. 5, the application deployment container 4021 requests the cloud computing environment 400 to deploy respective function PODs 403 comprising corresponding function containers 404 for corresponding functions of the database 501, the register 502, the user management 503, the weather query 504, the statistics 505 and the monitor 506 in response that the CR monitor 4022 detects the CR file shown in FIG. 6 in the repository 4012 for the first time. The cloud computing environment 400 finds out that these function PODs 403 comprising corresponding function containers 404 do not exist in the cloud computing environment 400 and deploys them directly. For the second time, the CR monitor 4022 detects the CR file (no change) shown in FIG. 6 in the repository 4012 again after 5 minutes, the application deployment container 4021 again requests the cloud computing environment 400 to deploy the function PODs 403 comprising corresponding function containers 404 for respective functions of the database 501, the register 502, the user management 503, the weather query 504, the statistics 505 and the monitor 506. But the cloud computing environment 400 finds out that these function PODs 403 comprising corresponding function containers 404 have been existed in cloud computing environment 400, so won't deploy them. For the third time, the CR monitor 4022 detects the CR file (with change of the function of the register 502) shown in FIG. 6 in the repository 4012 after such as 5 minutes, the application deployment container 4021 again requests the cloud computing environment 400 to deploy the function PODs 403 comprising corresponding function containers, for respective functions of the database 501, the register 502, the user management 503, the weather query 504, the statistics 505 and the monitor 506 respectively again. The cloud computing environment 400 at this time finds out that some function PODs 403 comprising corresponding function containers 404 exist in the cloud computing environment 400 and only the function of the register 502 is changed, the cloud computing environment 400 may just deploy register the function POD 403-2 comprising corresponding register container 404-2 to replace the original ones or may apply the change to the original register function POD 403-2 comprising corresponding register container 404-2. From the process described above, it can be found out that whether the CR file is a new CR file, an existing CR file, or an updated the CR file is actually checked by the cloud computing environment 400 in the existing process, and the checking is time and resource consuming.

In fact, during the application deployment, when a function, for example register 502, is to be deployed, the register 502 is requested to write information (i.e. the function of register 502 depends on the function of database 501) into a database during the deployment, so before the deployment of the register 502, the function of the database 501 must be deployed, otherwise, the deployment of the register 502 cannot be successful. In other words, if the functions have dependency relationship, the dependency relationships among the functions of the application should be considered during application deployment.

In this disclosure, the dependency relationships among the functions of the application are considered during the process of the application deployment. Table 1 is an example list of dependency relationships among the functions of application 500. As shown, Table 1 may record function and its dependent function(s). Those skilled in the art may understand that the schemas of the dependency relationships among the functions of the application shown in Table 1 is just for illustrative purpose, other columns can be added to the Table 1. Further, it should be understood that the aforementioned table is only an implementation to represent the dependency relationships among the functions of the application, other data structures can be used to represent the dependency relationships among the functions of the application, such as an XML file, a text file, and the like. In some embodiments, the dependency relationships among the functions of the application can be represented with an object type, e.g., ConfigMap defined in Kubernetes.

TABLE 1

| function | Dependent function(s) |
| --- | --- |
| database 501 | |
| register 502 | database 501 |
| user management 503 | database 501 |
| weather query 504 | database 501 |
| statistics 505 | user management 503 |
| monitor 506 | user management 503, weather query 504 |

In addition, the deployment status of each function POD comprising corresponding function container which may be deployed in the cloud computing environment and be configured to execute each function of the application, needs to be checked by other function deployment process. Table 2 is an example function deployment status for each function POD corresponding to each function in a CR file. Table 2 can be created when the CR file is first retrieved. At this time, the CR file is a new CR file. After the new CR file is first retrieved into the cloud environment, the CR file becomes an existing CR file. When the CR file in the repository is changed, the CR file becomes an updated CR file. During the lifecycle of the CR file, the example function deployment status for each function POD shown in Table 2 is always related to the CR file. As shown, Table 2 may record each function POD (such as using corresponding function name) and corresponding deployment status, such as "deployed", "un-deployed", or "updated", which respectively mean a function POD comprising corresponding function container is deployed, un-deployed or updated. Those skilled in the art may understand that the schemas of deployment status of each function POD shown in Table 2 is just for illustrative purpose, other columns can be added to the Table 2. Further, it should be understood that the aforementioned Table 2 is only an implementation to represent the schemas of deployment status of each function POD, other data structures can be used, such as XML file, text file, and the like. In some embodiments, the schemas of deployment status of each function POD can be represented with an object type, e.g., ConfigMap defined in Kubernetes.

TABLE 2

| Function POD | deployment status |
| --- | --- |
| database 501 | deployed |
| register 502 | deployed |
| user management 503 | deployed |
| weather query 504 | updated |
| statistics 505 | un-deployed |
| monitor 506 | un-deployed |

Figure 7:
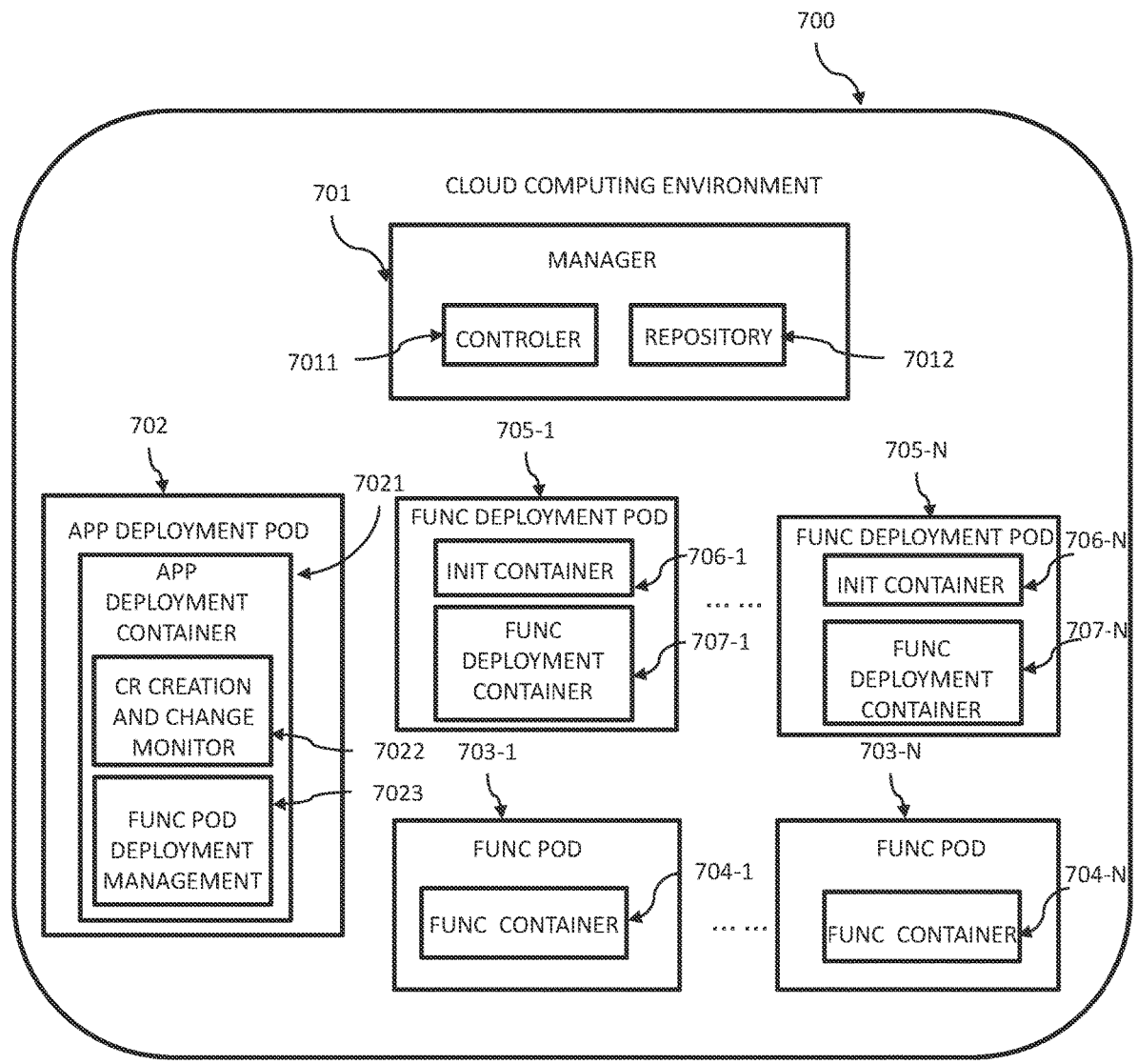
FIG. 7 depicts a schematic diagram of a cloud computing environment for deploying applications according to some embodiments of the present disclosure.

FIG. 7 depicts a schematic diagram of a proposed example cloud computing environment 700 for deploying applications according to some embodiments of the present disclosure. Still suppose that the application deployed in the cloud computing environment 700 may comprise N functions, where N is an integer larger than one. Now referring to FIG. 7, in the proposed example cloud computing environment 700, a manager 701 may at least comprise a controller 7011 and a repository 7012. In order to deploy the application, an administrator of the cloud computing environment 400 may deploy an application deployment POD 702 comprising a corresponding application deployment container 7021. The image used by the application deployment container 7021 is different from the one used by the application deployment container 4021, which will be introduced in detail later. After being deployed, the application deployment container 7021 may comprise two components: a CR creation and change monitor 7022 and a function POD deployment management 7023 (the two components are defined in the image file corresponding to the application deployment container 7021).

In some embodiments, the dependency relationships among the functions of the application (such as information in Table 1) may be stored in the repository 7012 or inside the application deployment container 7021. In some embodiments, the deployment status of each function POD (such as information in Table 2) may be stored in the repository 7012 or inside the application deployment container 7021. In some embodiments, the deployment status of each function POD (such as information in Table 2) may be obtained directly from Table 2 or in real time through an API defined by the cloud computing environment 700.

All components inside of the cloud computing environment 700 are connected directly or indirectly via communication network (not shown in FIG. 7). The communication network in FIG. 7 may include various types of communication networks, such as a wide area network (WAN), local area network (LAN), a telecommunication network, a wireless network, a public switched network and/or a satellite network. The communication network may include connections, such as wire, wireless communication links, or fiber optic cables.

Each component in the cloud computing environment 700 may be, for example, a mobile device, a telephone, a personal digital assistant, a netbook, a laptop computer, a tablet computer, a desktop computer, or any type of computing device capable of running a program and accessing a network. Cloud computing environment 700 may operate in a cloud computing service model, such as Software as a Service (SaaS), Platform as a Service (PaaS), or Infrastructure as a Service (IaaS). Cloud computing environment 700 may also be located in a cloud computing deployment model, such as a private cloud, community cloud, public cloud, or hybrid cloud.

Referring back to FIG. 7, the CR creation and change monitor 7022 may determine whether a CR file in the repository 7012 is a new CR file, an updated CR file, or an existing CR file. In some embodiments, the CR creation and change monitor 7022 may maintain all CR file retrieved from the repository 7012 last time. When the CR creation and change monitor 7022 retrieves the CR files in the repository 7012 again, the retrieved CR files can be compared with the saved CR files to find which retrieved CR files are new, updated or existed. In some embodiments, the CR creation and change monitor 7022 may maintain necessary information of all CR files retrieved from the repository 7012 last time, such as CR file name, deployed time, and hash code of the file contents. When the CR creation and change monitor 7022 retrieves the CR files in the repository 7012 again, the information of retrieved CR files can be compared with the information of the saved CR files to find which retrieved CR files are new, updated or existed. For example, if there is no related information for a retrieved CR file, the CR file is a new CR file. If there is related information for a retrieved CR file but the information is not consistent with the saved information, such as hash value of the file contents are different, the CR file is an updated file. If there is related information for a retrieved CR file and the information is consistent with the saved information, the CR file is an existing CR file. In some embodiments, the CR creation and change monitor 7022 may register to the repository 7012 to receive information about all CR files. Those skilled in the art may understand that other methods can be used.

In some embodiments, when the CR creation and change monitor 7022 detects a new CR file in the repository 7012, the CR creation and change monitor 7022 may notify the function POD deployment management 7023, then the function POD deployment management 7023 may request the cloud computing environment 700 to deploy each function deployment PODs comprising a corresponding init container configured to manage dependency relationships and a corresponding function deployment container configured to request to deploy a function POD comprising a corresponding function container for executing a corresponding function in the application. For example, a function deployment POD 705-1 comprising an init container 706-1 and a function deployment container 707-1, . . . , and a function deployment POD 705-N comprising an init container 706-N and a function deployment container 707-N. Here for ease of discussion, the function deployment PODs 705-1, . . . , 705-N are collectively or individually referred to as function deployment POD 705; the init containers 706-1, . . . , 706-N are collectively or individually referred to as init container 706, and function deployment containers 707-1, . . . , 707-N are collectively or individually referred to as function deployment container 707. When sending the request, the function POD deployment management 7023 may also send environment variable for each function deployment POD 705, which can be shared by the corresponding init container 706 and the corresponding function deployment container 707. The environment variable indicates the corresponding part in CR file for the corresponding function of the application.

In some embodiment, when the CR creation and change monitor 7022 detects a new CR file in the repository 7012, status of each function POD corresponding the new CR file (such as information in Table 2) can be maintained in the cloud computing environment. And initial value of the status of each function POD is set to "undeployed".

Then cloud computing environment 700 may deploys respective function deployment PODs 705 comprising corresponding init containers 706 and corresponding function deployment containers 707 directly without needs to check whether respective function deployment PODs 705 are existed. Each function deployment POD 705 may maintain its own environment variable. After each corresponding init container 706 is deployed, each init container 706 may determine its own function dependency. Specifically, each init container 706 may retrieve the dependency relationships among the functions of the application such as shown in Table 1, then compare them with its own environment variable to obtain its own function dependency. For example, if the environment variable indicates that the function deployment POD 705-1 is for the function of the database 501, then there is no dependent function. Then the function deployment container 707-1 may inform the cloud computing environment 700 to deploy a function POD 703-1 comprising a function container 704-1. In some embodiments, the cloud computing environment 700 may deploy the function POD 703-1 comprising the function container 704-1 directly without checking whether it is existed. After that, the function deployment container 707-1 or the function container 704-1 may update the status of the function POD 703-1 corresponding to the database 501 as "deployed", as shown in Table 2.

In another example, after a function deployment POD 705-2 comprising an init container 706-2 and a function deployment container 707-2 is deployed, if the environment variable indicates that the function deployment POD 705-2 is for the register 502, then its dependent function is the database 501. Then an init container 706-2 may check the status of function POD 703-1, such as check in Table 2 or check in real time with the API provided by the cloud computing environment 700. If the status is "undeployed", the init container 706-2 may check again and again until the status is "deployed". Then the function deployment container 707-2 may request the cloud computing environment 700 to deploy a function POD 703-2 comprising a function container 704-2. In some embodiments, the cloud computing environment 700 may deploy the function POD 703-2 comprising the function container 704-2 directly without checking whether it is existed. After that, the function deployment container 707-2 or the function container 704-2 may update the status of the function POD 703-2 corresponding to the register 502 as "deployed", as shown in Table 2.

In this way, respective init containers (such as init containers 706-3, 706-4, 706-5 and 706-6) may check status of dependent function POD(s) corresponding to dependent function(s) until the status is "deployed", then respective function deployment containers may request the cloud computing environment 700 to deploy respective function PODs (such as function PODs 703-3, 703-4, 703-5, 703-6) comprising corresponding function containers (such as function containers 704-3, 704-4, 704-5, 704-6). In some embodiments, the cloud computing environment 700 may deploy respective function PODs (such as function PODs 703-3, 703-4, 703-5, 703-6) comprising corresponding function containers (such as function containers 704-3, 704-4, 704-5, 704-6) directly without checking whether they are existed. After that, respective function deployment containers (such as init container 707-3, 707-4, 707-5, 707-6) or respective function containers (such as function containers 704-3, 704-4, 704-5, 704-6) may update the status of respective function PODs (such as corresponding to the user management 503, the weather query 504, the statistics 505 and the monitor 506) as "deployed", as shown in Table 2.

From the above description, it can be found that function PODs corresponding to the register 502, the user management 503 and the weather query 504 in application 500 may be deployed in parallel, and function PODs corresponding to the statistics 505 and the monitor 506 may be deployed in parallel. The time consumed for deploying respective function deployment PODs comprising both corresponding init containers and corresponding function deployment containers is small and can be ignored. Then the maximum time for deploying these functions may be T=T1+max(T2,T3,T4)+max(T5,T6), which is much less than the deployment time using the cloud computing environment 400.

In some embodiments, after all function PODs comprising corresponding function containers are deployed, the status of each function POD of the application 500 is updated to be "deployed", then the function POD deployment management 7023 may delete all function deployment PODs 705 comprising both corresponding init container 706 and corresponding function deployment containers 707 to save resource for cloud computing environment 700.

In some embodiments, when the CR creation and change monitor 7022 detects an updated CR file in the repository 7012 (i.e., there is a change for an existing CR file), the CR creation and change monitor 7022 may notify the function POD deployment management 7023 of the change, e.g., the CR creation and change monitor 7022 may inform the changed part of the CR file in the repository 7012. For example, if the part corresponding to the block 602 in FIG. 6 is changed, in response to the notification comprising changed part in the CR file, the function POD deployment management 7023 may request the cloud computing environment 700 to only deploy the function deployment POD 703-2 comprising both the init container 706-2 and the function deployment container 707-2, and the function deployment container 707-2 may request the cloud computing environment 700 to update the function POD 703-2 comprising the function container 704-2, that is, either deploy the function POD 703-2 comprising the function container 704-2 to replace the original one or apply the change to the existing function POD 703-2 comprising the function container 704-2. In some embodiments, the cloud computing environment 700 may delete originally deployed function POD 703-2 comprising function container 704-2 and redeployed them based on the changed part of the CR file directly without checking. In some embodiments, the cloud computing environment 700 may apply the change to the original deployed function POD 703-2 comprising function container 704-2 directly without checking. How the cloud computing environment 700 applies the change is an existing technology, which will not be discussed in detail in this specification.

In some embodiments, after the function POD 703-2 comprising the function container 704-2 are updated, the function deployment container 707-2 or the function container 704-2 may change the status of the function POD 703-2 in Table 2 from "deployed" to "updated". Then the function POD deployment management 7023 may delete the function deployment POD 703-2 comprising both the init container 706-2 and the function deployment container 707-2 to save resource for the cloud computing environment 700. After that, the function POD deployment management 7023 may change the status of the function POD 703-2 from "updated" to "deployed" for further update.

In some embodiments, an init container 706 and its corresponding function deployment container 707 can be merged into one container, a merged function deployment container with two components, such as init component and function deployment component. All actions executed by init container 706 may be executed by the init component of the merged function deployment container and all actions executed by function deployment container 707 may be executed by the function deployment component of the merged function deployment container. Contents in the image files corresponding to the init container 706 and its corresponding function deployment container 707 and may be merged into contents in the image file corresponding to the merged function deployment container. In other words, the application deployment container 7021 may request the cloud computing environment 700 to deploy a plurality of function deployment POD 705 comprising corresponding merged function deployment containers directly instead of deploying a plurality of function deployment PODs 705 comprising both corresponding init containers 706 and corresponding function deployment containers 707. Cloud computing environment 700 may then deploy a plurality of function deployment PODs 705 comprising corresponding merged function deployment containers directly without checking. In addition, the merged function deployment container may request the cloud computing environment 700 to deploy/update corresponding function POD 703 comprising corresponding function container 704 and then the cloud computing environment 700 may do that directly without checking.

In some embodiments, all PODs in FIG. 7 are not necessary. For example, the administrator may just deploy the application deployment container 7021 directly instead of deploying the application deployment POD 702 comprising corresponding application deployment container 7021, and the application deployment container 7021 may deploy a plurality of function deployment containers 707 directly instead of deploying a plurality of function deployment PODs comprising corresponding function deployment containers.

Figure 8:
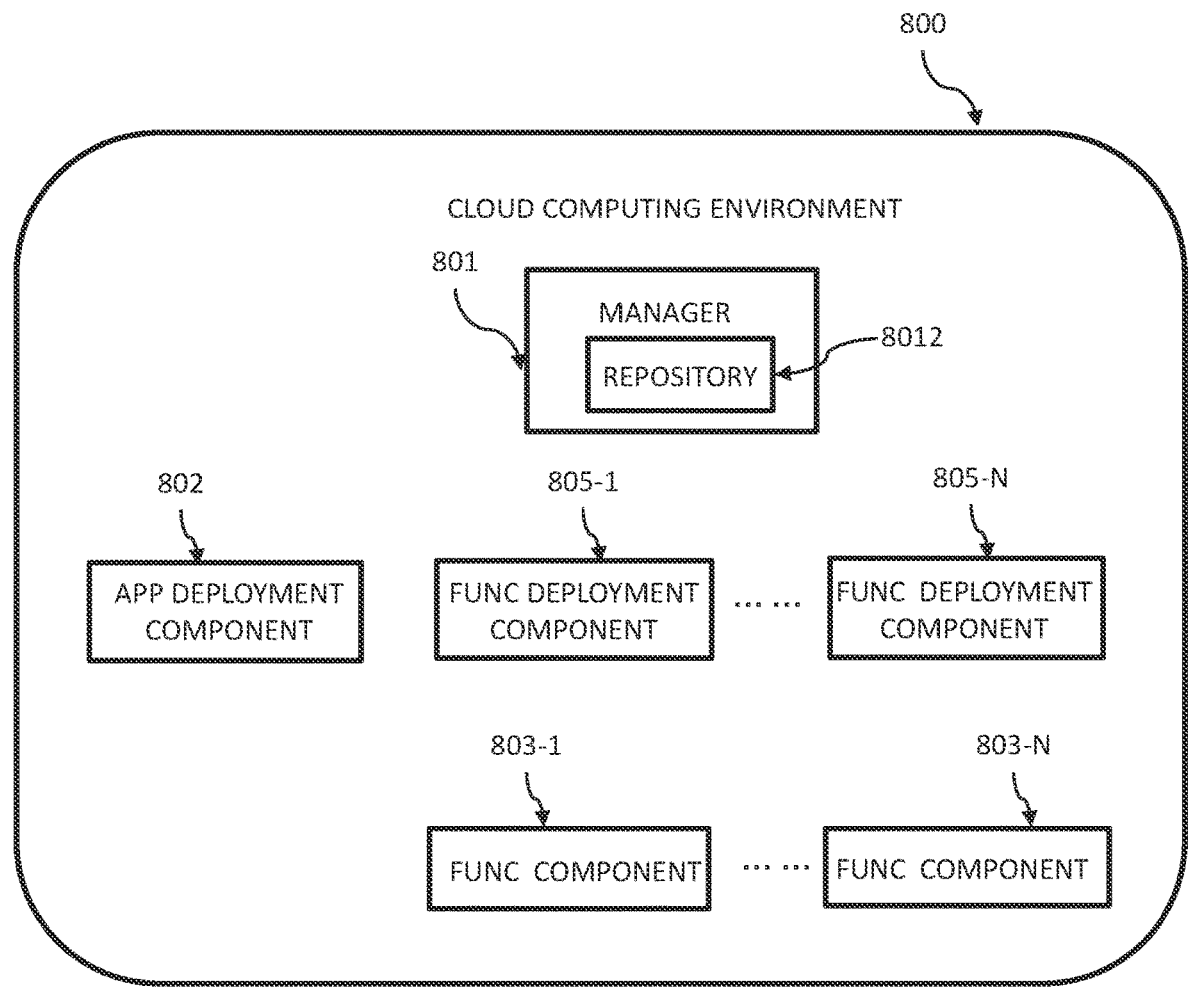
FIG. 8 depicts an abstract schematic diagram of a cloud computing environment for deploying applications according to some embodiments of the present disclosure.

FIG. 8 depicts an abstract schematic diagram of a proposed example cloud computing environment 800 for deploying applications according to some embodiments of the present disclosure. Referring to FIG. 8, for ease of discussion, function deployment components 805-1 . . . 805-N are collectively or individually referred to as function deployment component 805, and function components 803-1 . . . 803-N are collectively or individually referred to as function component 803. Comparing FIG. 8 with FIG. 7, a manager 801 may be the manager 701; an application development component 802 may be the application development POD 702 comprising the application deployment container 7021 or may be the application deployment container 7021; a function deployment component 805 may be the function deployment POD 705 comprising both corresponding init container 706 and corresponding function deployment container 707, or may be the function deployment POD 705 comprising the merged function deployment container, or may be the merged function deployment container; a function component 803 may be the function POD 703 comprising corresponding function container 704, or may be the function deployment container 704.

Figure 9:
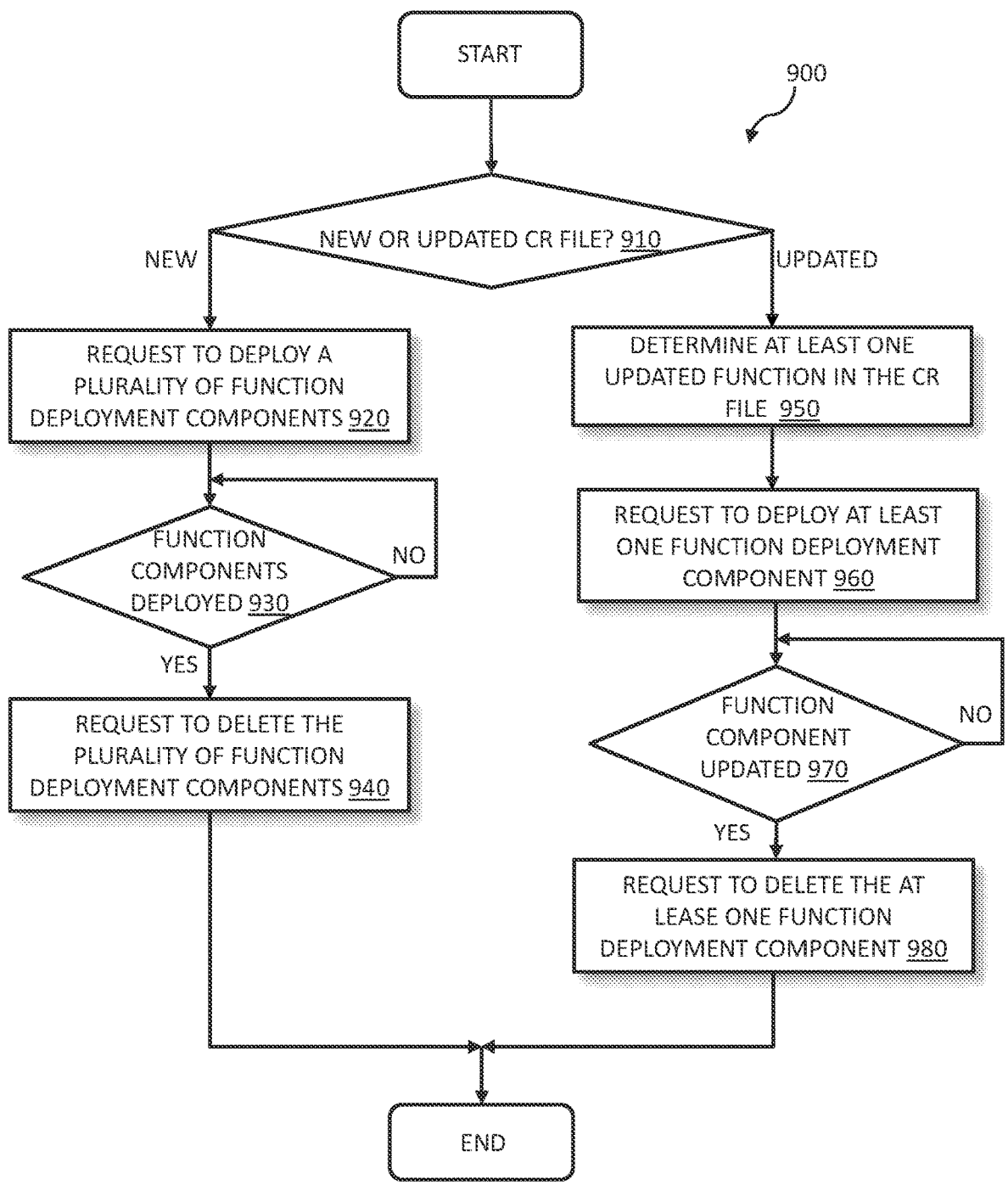
FIG. 9 depicts a flowchart of an approach for application deployment in a cloud computing environment according to some embodiments of the present disclosure.

FIG. 9 depicts a flowchart 900 for application deployment in a cloud computing environment according to some embodiments of the present disclosure. The flowchart 900 may be implemented by application deployment component 802, or other suitable computer/computing systems, which is referred to as a first component with one or more processors in the cloud computing environment 800. For ease of understanding, the flowchart 900 will be described with reference to FIG. 8.

At 910, the application deployment component 802 (a first component) may detect in the repository 8012 whether there is a new CR file, or an updated CR file. In other words, existing CR files without change will be not considered. The CR file is configured to indicate information of a plurality of functions of an application.

At 920, in response to detecting a new CR file, the application deployment component 802 may request the cloud computing environment 800 to deploy a plurality of function deployment components 805 in the cloud computing environment 800, wherein the plurality of function deployment components 805 are configured to request the cloud computing environment 800 to deploy a plurality of function components 803 in cloud computing environment 800, and the plurality of function components 803 are configured to execute the plurality of functions of the application indicated by the new CR file.

At 930, the application deployment component 802 (a first component) may implement a first determination of whether each of the plurality of function components 803 has been deployed in cloud computing environment 800. In some embodiments, status of each of the plurality of function components (such as information in Table 2) is maintained in the cloud computing environment 800, the application deployment component 802 may retrieve status of each of the plurality of function components and may determine whether each of the plurality of function components 803 has been deployed in the cloud computing environment 800 based on the retrieved status. In some embodiments, the application deployment component 802 may check status of each of the plurality of function components to the cloud computing environment 800 with an API provided by the cloud computing environment 800 to determine whether each of the plurality of function components 803 has been deployed in the cloud computing environment 800.

At 940, in response to the first determination indicating each of the plurality of function components has been deployed in the cloud computing environment 800, the application deployment component 802 may request the cloud computing environment 800 to delete the plurality of deployed function deployment components 805 to save the resource in the cloud computing environment 800.

In some embodiments, at 950, in response to detecting the CR file being an updated CR file, the application deployment component 802 may determine at least one updated function in the updated CR file.

At 960, the application deployment component 802 may request cloud computing environment 800 to deploy at least one function deployment component in cloud computing environment 800. Here the at least one function deployment component is configured to request the cloud computing environment 800 to deploy/update at least one function component in cloud computing environment 800, and the at least one function component is configured to execute the at least one updated function. After being deployed/updated, the status of the at least one function component in Table 2 may be changed accordingly.

Then at 970, the application deployment component 802 may implement a second determination of whether each of the at least one function component 803 has been updated in the cloud computing environment 800. In some embodiments, status of each of the at least one function component is maintained in the cloud computing environment 800, the application deployment component 802 may retrieve status of each of the at least one function component and may determine whether the at least one function component 803 has been updated in cloud computing environment 800 based on the retrieved status, such as checking whether the status of the at least one function component 803 in Table 2 is "updated". In some embodiments, the application deployment component 802 may check status of each of the at least one function component to the cloud computing environment 800 with an API provided by the cloud computing environment 800 to determine whether the at least one function components 803 has been updated in the cloud computing environment 800.

At 980, in response to the second determination indicating each of the at least one function component has been updated in the cloud computing environment 800, the application deployment component 802 may request the cloud computing environment 800 to delete the at least one deployed function deployment component 805 to save the resource in the cloud computing environment 800. And then the application deployment component 802 may change the status of the at least one function component 803 in Table 2 from "updated" to "deployed" for further function update.

In some embodiments, dependency relationships among the plurality of functions of the application is maintained in cloud computing environment 800.

Figure 10:
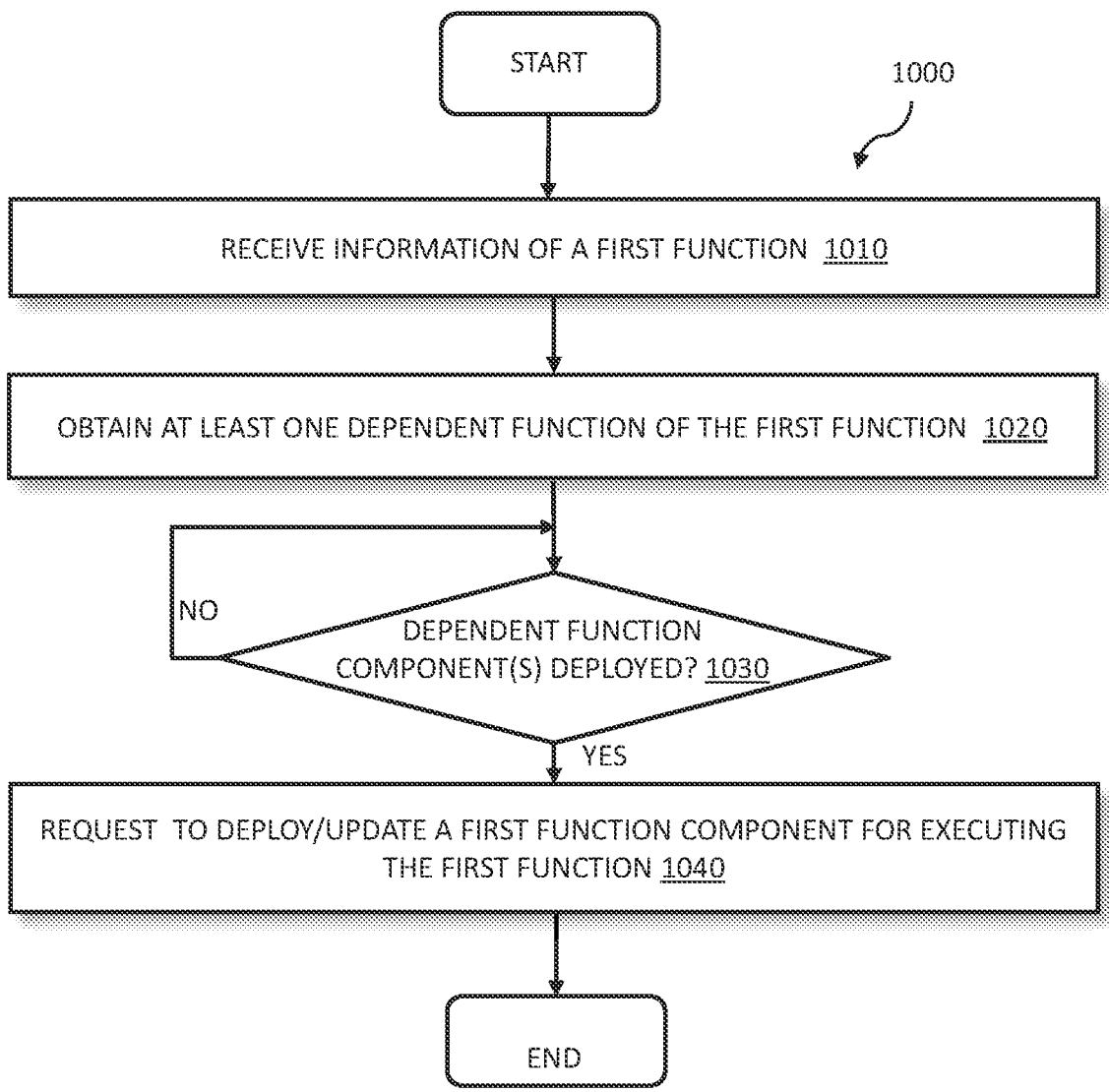
FIG. 10 depicts a flowchart of an approach, as a part of the approach shown in FIG. 9, according to some embodiments of the present disclosure.

In some embodiments, FIG. 10 depicts a flowchart 1000, as part of the approach shown in FIG. 9, according to some embodiments of the present disclosure. The flowchart 1000 may be implemented by function deployment components 805, or other suitable computer/computing systems, which is configured to deploy a corresponding function component 803. For ease of understanding, the flowchart 1000 will be described with reference to FIG. 8 using the function deployment component 805-2 as an example, which is configured to request the cloud computing environment to deploy/update a corresponding function component (such as 803-2) for executing a corresponding function. Suppose that the function corresponding to the function component 803-2 depends on at least one function corresponding to at least one dependent function component 803-1.

At 1010, the function deployment component 805-2 may receive information of the corresponding function from the application deployment component 802, such as corresponding location of image file, whether the corresponding function is a new function or an updated function, and the like.

At 1020, the function deployment components 805-2 may obtain at least one dependent function of the corresponding function from the dependency relationships among the plurality of functions of the application.

At 1030, the function deployment component 805-2 may implement a third determination of whether at least one dependent function component (803-1) corresponding to the at least one dependent function has been deployed in the cloud computing environment 800. The determination method is similar to the method used in 930 and 970.

At 1040, in response to the third determination indicating each of the at least one dependent function component (803-1) has been deployed in the cloud computing environment 800, the function deployment component 805-2 may request the cloud computing environment 800 to deploy/update the function component 803-2 in the cloud computing environment 800 directly without checking based on the information received.

In some embodiments, at 1050 (not shown in FIG. 10), in response to the corresponding function component 803-2 has been deployed in the cloud computing environment 800, the function deployment component 805-2 or the corresponding function component 803-2 may update status of the corresponding function component 803-2, such as change the status from "undeployed" to "deployed" in Table 2.

The proposed method can make it easier from architectural level to deploy application in a cloud computing environment. In addition, it is easier for developers to develop framework for deploying application in a cloud computing environment using the proposed method.

It should be noted that the processing of application deployment in a cloud computing environment according to embodiments of the present disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   in response to detecting an updated CR file:
   determining, by one or more processors, at least one updated function in the updated CR file;

requesting, by one or more processors, a computing environment to deploy at least one function deployment component corresponding to the at least one updated function in the computing environment, wherein:
    the at least one function deployment component requests the computing environment to update at least one function component in the computing environment; and
    the at least one function component executes the at least one updated function;
determining, by one or more processors, that each of the at least one function component has been updated in the computing environment; and
in response to determining that each of the at least one function component has been updated in the computing environment, requesting, by one or more processors, the computing environment to delete each of the at least one deployed function deployment components.

2. The method of claim 1, wherein the computing environment is a cloud computing environment.

3. The method of claim 2, wherein dependency relationships among a plurality of functions of the application are maintained in the cloud computing environment.

4. The method of claim 3, wherein each of the at least one function deployment component requests the cloud computing environment to deploy a corresponding function component for executing a corresponding function by:
    receiving, by one or more processors, information of the corresponding function;
    obtaining, by one or more processors, at least one dependent function of the corresponding function from the dependency relationships among the plurality of functions of the application;
    determining, by one or more processors, that each of at least one dependent function components corresponding to the at least one dependent function have been deployed in the cloud computing environment; and
    in response to determining that each of the at least one dependent function components have been deployed in the cloud computing environment, requesting, by one or more processors, the cloud computing environment to deploy the corresponding function component in the cloud computing environment based on the received information.

5. The method of claim 4, wherein a status of each function component is maintained in the cloud computing environment and each of the plurality of the function deployment components deploys a corresponding function component for executing a corresponding function further by:
    in response to the corresponding function component being deployed in the cloud computing environment, updating, by one or more processors, a status of the corresponding function component.

6. The method of claim 5, wherein each determination is determined by checking status of at least one corresponding function component maintained in the cloud computing environment.

7. The method of claim 5, wherein each determination is determined by checking status of at least one corresponding function component to the cloud computing environment using an application programming interface (API) provided by the cloud computing environment.

8. A computer program product comprising:
one or more computer readable storage media, and program instructions collectively stored on the one or more computer readable storage media, the program instructions comprising:
program instructions, to, in response to detecting an updated CR file:
    determine at least one updated function in the updated CR file;
    request the cloud computing environment to deploy at least one function deployment component corresponding to the at least one updated function in the cloud computing environment, wherein:
        the at least one function deployment component requests the cloud computing environment to update at least one function component in the cloud computing environment; and
        the at least one function component executes the at least one updated function;
    determine that each of the at least one function component has been updated in the cloud computing environment; and
    in response to determining that each of the at least one function component has been updated in the cloud computing environment, request the cloud computing environment to delete each of the at least one deployed function deployment components.

9. The computer program product of claim 8, wherein the computing environment is a cloud computing environment.

10. The computer program product of claim 9, wherein dependency relationships among a plurality of functions of the application are maintained in the cloud computing environment.

11. The computer program product of claim 10, wherein each of the at least one function deployment component requests the cloud computing environment to deploy a corresponding function component for executing a corresponding function by:
    receiving information of the corresponding function;
    obtaining at least one dependent function of the corresponding function from the dependency relationships among the plurality of functions of the application;
    determining that each of at least one dependent function components corresponding to the at least one dependent function have been deployed in the cloud computing environment; and
    in response to determining that each of the at least one dependent function components have been deployed in the cloud computing environment, requesting the cloud computing environment to deploy the corresponding function component in the cloud computing environment based on the received information.

12. The computer program product of claim 11, wherein a status of each function component is maintained in the cloud computing environment and each of the plurality of the function deployment components deploys a corresponding function component for executing a corresponding function further by:
    in response to the corresponding function component being deployed in the cloud computing environment, updating a status of the corresponding function component.

13. The computer program product of claim 12, wherein each determination is determined by checking status of at least one corresponding function component maintained in the cloud computing environment.

14. The computer program product of claim 12, wherein each determination is determined by checking status of at least one corresponding function component to the cloud computing environment using an application programming interface (API) provided by the cloud computing environment.

15. A computer system comprising:
one or more computer processors, one or more computer readable storage media, and program instructions collectively stored on the one or more computer readable storage media for execution by at least one of the one or more computer processors, the program instructions comprising:
program instructions, to, in response to detecting an updated CR file:
determine at least one updated function in the updated CR file;
request the cloud computing environment to deploy at least one function deployment component corresponding to the at least one updated function in the cloud computing environment, wherein:
the at least one function deployment component requests the cloud computing environment to update at least one function component in the cloud computing environment; and
the at least one function component executes the at least one updated function;
determine that each of the at least one function component has been updated in the cloud computing environment; and
in response to determining that each of the at least one function component has been updated in the cloud computing environment, request the cloud computing environment to delete each of the at least one deployed function deployment components.

16. The computer system of claim 15, wherein the computing environment is a cloud computing environment.

17. The computer system of claim 16, wherein dependency relationships among a plurality of functions of the application are maintained in the cloud computing environment.

* * * * *